UNITED STATES PATENT OFFICE.

ARTHUR WILLIAM WELLER AND WILLIAM THOMAS ROBINSON-BINDLEY, OF LONDON, ENGLAND.

PHENOL-FORMALDEHYDE CONDENSATION PRODUCT AND THE PRODUCTION THEREOF.

1,368,867.  Specification of Letters Patent.  Patented Feb. 15, 1921.

No Drawing.  Application filed June 17, 1920. Serial No. 389,635.

*To all whom it may concern:*

Be it known that we, ARTHUR WILLIAM WELLER and WILLIAM THOMAS ROBINSON-BINDLEY, subjects of the King of England, both residing at London, England, have invented certain new and useful Improvements in Phenol-Formaldehyde Condensation Products and the Production Thereof, of which the following is a specification.

This invention relates to compositions of matter and to the production thereof by the condensation of phenols with formaldehyde, and has for its object to provide an improved material of this kind.

According to the present invention the improved process for the manufacture of compositions of matter by the combination of phenols with formaldehyde, comprises condensing the reagents in presence of a very small proportion of cellulose acetate or nitrocellulose. Preferably, the cellulose derivative is dissolved in the phenol, most expeditiously by the aid of gentle heat, and the phenol is then condensed with the aldehyde. The particular cellulose derivative employed depends upon the kind of product required. If it be desired merely to obviate objectionable odor in the final product nitro-cellulose may be used, while if the product is also to possess superior toughness, cellulose acetate may be taken. The proportion of cellulose derivative may be varied, but as a general rule it may be said that the maximum amount should not exceed about 0.7–0.8 per cent. on the phenol taken.

Various substances have been proposed for incorporation with phenol-formaldehyde condensation products to act as fillers for, or to impart elasticity to, the latter, and among such substances cellulose esters, as nitro-cellulose and cellulose acetate have been mentioned. Such processes, however, must not be confused with the present invention, according to which substantial proportions of the cellulose derivative are never employed, the proportion being always so small as, from the point of view of a mere filler, to be wholly negligible. Moreover, the products obtained according to this invention are not elastic. It has further been found that when toughness is desired the addition of any but very small proportions of cellulose acetate yields a product whose friability is markedly increased.

In carrying the invention into effect in one way, a weighed amount of the cellulose derivative, for example, a good quality cellulose acetate, is added to the phenol, for example, ordinary phenol, or one of the cresols, or a mixture of phenols, and an aliquot quantity of the phenol is measured or weighed out to give the desired proportion of the cellulose acetate. When large quantities of material are being handled the requisite amount of the cellulose derivative may be directly weighed and added to the quantity of phenol taken. The phenol containing the derivative is then condensed with the formaldehyde in any suitable known way.

*Example.*

Cresylic acid (98–99%) _____ 100 grams.
Formaldehyde (40% solution)_ 100 cc.
Caustic soda _____ 1 gram.
Cellulose acetate, 0.0025% on cresylic acid taken.

The cellulose acetate is dissolved in the warm cresylic acid, and the acid and the formaldehyde solution, in which the caustic soda has been previously dissolved, are mixed. The phenol and the formaldehyde solution are preferably mixed warm, but must not be hot. The mixture is then heated for about one-quarter-of-an-hour to half-an-hour at 90° C. A liquid is obtained, the color of which depends on the purity of the phenol used. This liquid is boiled down to a viscous consistency, say, that of molasses, poured into the molds and baked in an oven at 60° C. at ordinary atmospheric pressure till sufficiently hard. The product may be further treated in an autoclave if desired. The material so obtained is colorless and hard and exceptionally tough.

It has been found that by the use according to this invention of cellulose acetate or nitro-cellulose it is possible to obtain a material of superior strength, and, small as are the proportions of cellulose derivative employed, also to diminish or to destroy the objectionable odor which is so frequently associated with these phenol-formaldehyde condensation products, and which militates greatly against their employment for a number of purposes.

It is to be understood that the invention is not limited to the use of a particular phenol, or phenol mixture, or condensing agent, and that the reagents and proportions more specifically referred to herein are given by way of example. The term formaldehyde is intended to include such derivatives of this compound as will yield, or will act as, formaldehyde in the condensation reaction.

What we claim as our invention and desire to secure by Letters Patent is:—

1. A process for the manufacture of condensation products of phenols and formaldehyde, which comprises condensing the reagents in presence of a cellulose derivative as a toughening agent.

2. A process as claimed in the preceding claim No. 1, in which the cellulose derivative is dissolved in the phenol, preferably by the aid of heat, and the phenol then condensed with the aldehyde.

3. A process as claimed in the preceding claim No. 1 in which the maximum proportion of cellulose derivative is of the order of about 0.7–0.8 per cent. on the phenol taken.

4. A condensation product of a phenol or phenolic mixture, and formaldehyde, containing a cellulose derivative as a toughening agent.

5. A condensation product of a phenol or phenolic mixture, and formaldehyde, containing a cellulose derivative not in excess of about .7% or .8% of the phenol taken.

6. A process for the manufacture of condensation products of phenol and formaldehyde, which comprises condensing the reagents in the presence of a cellulose derivative not in excess of about .7% or .8% of the phenol taken.

In testimony whereof we have signed our names to this specification in the presence of two subscribing witnesses.

ARTHUR WILLIAM WELLER.
WILLIAM THOMAS ROBINSON-BINDLEY.